J. F. DAUGHERTY.
CHAIN-PUMP BUCKETS.

No. 180,465. Patented Aug. 1, 1876.

Witnesses
Grenville Lewis
Chas. C. Gill

Inventor
Jacob F. Daugherty
by his Attys.
Cox and Cox

UNITED STATES PATENT OFFICE.

JACOB F. DAUGHERTY, OF QUINCY, ILLINOIS.

IMPROVEMENT IN CHAIN-PUMP BUCKETS.

Specification forming part of Letters Patent No. 180,465, dated August 1, 1876; application filed July 6, 1876.

*To all whom it may concern:*

Be it known that I, JACOB F. DAUGHERTY, of Quincy, in the county of Adams and State of Illinois, have invented a new and useful Improvement in Chain-Pump Buckets, of which the following is a specification, reference being had to the accompanying drawings.

The invention relates to an improved chain-pump bucket or link, the object of which is to provide an expansible device that can be enlarged, as desired, and which will prevent the chain twisting.

Figure 1:
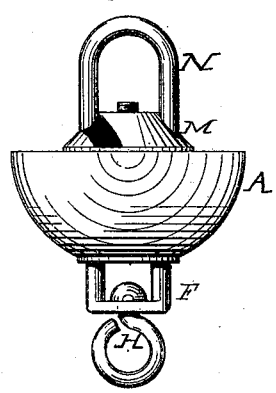
Figure 2:
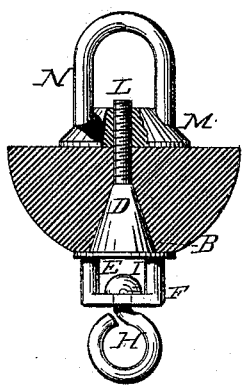

Figure 1 is a side elevation of a device embodying the elements of the invention. Fig. 2 is a central section of same.

In the accompanying drawings, A represents a dome-shaped piece of elastic material, rubber preferred, provided with the inverted cone-shaped aperture B, to receive, and accurately corresponding in superficies with, the cone D, above which is placed the annular disk E, provided at its center with the arch or loop F, in the center of which is an aperture to receive the shaft of the swivel H, having on its lower end, below the loop F, a button, I, to prevent the escape of the swivel. Below the cone B an aperture is made in the dome A, through which extends the threaded standard L, the upper part of which is rigidly fixed at the center of the disk, while the lower enters the plate M, forming the upper part of the lower loop N, extending below the lower end of the standard L. Preferably the cone D, disk E, loop F, and standard L are made, as in the present instance, in one piece.

It is obvious that the swivel H will prevent the chain, formed by uniting a series of these devices, from becoming twisted, or will suffice to take out the twist. In order to enlarge the area of the bucket it is only necessary to rotate the loop N, holding the upper parts of the device stationary. This draws down the cone D into the aperture B and expands the dome A on all sides, while a contrary operation will reduce the contour of the bucket; hence the device is easily adaptable to tubes of varying diameter.

What I claim as my invention, and desire to secure by Letters Patent, is—

1. The combination of the swivel H, loop F, cone E, and dome A, with its aperture B, as expressed.

2. The combination of the dome A, aperture B, cone E, swivel H, loop F, plate M, and loop N, arranged substantially as and for the purpose described.

In testimony that I claim the foregoing improvement in chain-pump buckets, as above described, I have hereunto set my hand this 24th day of June, 1876.

JACOB F. DAUGHERTY.

Witnesses:
 B. M. PRENTISS,
 NOAH N. TYNER.